(12) United States Patent
Bradley (10) Patent No.: US 7,080,482 B1
(45) Date of Patent: Jul. 25, 2006

(54) MODULAR PLANT GROWING APPARATUS

(76) Inventor: Treg Bradley, 215 E. Catalina, Phoenix, AZ (US) 85012

( * ) Notice: Subject to any disclaimer, the term of this patent is extended or adjusted under 35 U.S.C. 154(b) by 0 days.

(21) Appl. No.: 10/799,959

(22) Filed: Mar. 12, 2004

(51) Int. Cl.
*A01G 31/00* (2006.01)

(52) U.S. Cl. .............. 47/60; 47/82; 47/62 R
(58) Field of Classification Search .......... 47/59 R, 47/60–62, 82, 83
See application file for complete search history.

(56) References Cited

U.S. PATENT DOCUMENTS

| | | | | |
|---|---|---|---|---|
| 986,395 A | * | 3/1911 | King ................... | 47/33 |
| 1,740,057 A | * | 12/1929 | Babich ................. | 47/83 |
| 4,059,922 A | * | 11/1977 | DiGiacinto ............ | 47/82 |
| 4,218,847 A | * | 8/1980 | Leroux ................ | 47/59 R |
| 4,295,296 A | * | 10/1981 | Kinghorn .............. | 47/82 |
| 4,608,776 A | * | 9/1986 | Kooy .................. | 47/58.1 R |
| 4,788,792 A | * | 12/1988 | Womick ............... | 47/41.12 |
| 4,869,019 A | * | 9/1989 | Ehrlich ............... | 47/62 A |
| 4,930,643 A | * | 6/1990 | Flum .................. | 211/188 |
| 5,044,118 A | * | 9/1991 | Ferris ................ | 47/62 R |
| 5,095,649 A | * | 3/1992 | Brownlee ............. | 47/41.01 |
| 5,099,606 A | * | 3/1992 | Koerper .............. | 47/66.1 |
| 5,259,141 A | * | 11/1993 | D'Alessandro ......... | 47/39 |
| 5,440,836 A | * | 8/1995 | Lee ................... | 47/60 |
| 5,502,923 A | | 4/1996 | Bradshaw | |
| 5,996,280 A | * | 12/1999 | Michailiuk ........... | 47/86 |
| 6,269,589 B1 | * | 8/2001 | Bouler ............... | 47/65.5 |
| 6,477,805 B1 | | 11/2002 | Ware | |
| 6,615,542 B1 | * | 9/2003 | Ware ................. | 47/83 |
| 6,840,008 B1 | * | 1/2005 | Bullock et al. ....... | 47/82 |

\* cited by examiner

*Primary Examiner*—Teri Pham Luu
*Assistant Examiner*—Susan C. Alimenti (57) ABSTRACT

Modular plant growing apparatus includes a housing formed of inner and outer walls, opposed side walls, a bottom wall, and a top wall interconnected to define an enclosure. A liquid nutrient solution reservoir is formed in the enclosure by lower portions of the bottom, opposed side, and the inner and outer walls. The inner wall defines plant supporting structure including horizontally extending, vertically separated corrugations, each corrugation including a lower surface with a plurality of horizontally spaced apart plant receiving openings into the enclosure. A pump is positioned in the reservoir. A manifold and distribution conduits in liquid communication with the pump, include spray nozzles associated with the plant receiving openings within the enclosure for supplying liquid nutrient solution to roots of plants positioned in the plant receiving openings.

9 Claims, 14 Drawing Sheets

MODULAR PLANT GROWING APPARATUS

FIELD OF THE INVENTION

This invention relates to modular apparatus for use in growing plants by hydroponics or the like.

BACKGROUND OF THE INVENTION

In the field of growing plants, one common method used is known as hydroponics, or the cultivation of plants by placing the roots in a liquid nutrient solution rather than in soil, or the soilless growth of plants. In some instances a light soil or similar material (e.g. peat moss or even some man made materials) may be used to hold the roots but the primary nutrients are provided by solutions that are either added or in which the roots actually reside.

The major problem with this method of growing plants is the amount of area and equipment that is required. In most instances, a completely separate building is required with light and temperature control as well as containers for holding the plants and the nutrient solutions. This can be costly for start-ups and can severely limit the people who can participate, since most of this type of growing will take place in cities or highly populated areas where there is insufficient area for standard farming techniques and, thus, limited area for the installation of normal hydroponic type growing.

A large variety of hydroponics systems and methods of use are available or have been proposed. Most of these systems have serious limitations, such as the liquid circulation apparatus or limitations on the vertical or horizontal expansion of the systems. One prior art system, for example proposes a modular structure in which a lower module contains the liquid and a pump. The problem is, as the modules are stacked higher the pump must pump liquid farther and distribution of the liquid is very haphazard. In another prior art system a base contains the liquid supply and one or more columns extend vertically from the base. Liquid is pumped from the base through tubes to the top of the columns (one tube per column) and the liquid flows down across the roots of plants, residing in openings in the columns, and back into the base. Here the vertical height is limited to the height of the column and extra height cannot be added without completely changing the column.

Another problem that arises in many of the prior art devices, is proper lighting. In many of the prior art plant growth units, different types and amounts of light may be received by the plants in different positions. The differences in light quality and quantity may result in a divergence in growth and quality between plants grown at various levels and on various sides of the plant growth units.

It would be highly advantageous, therefore, to remedy the foregoing and other deficiencies inherent in the prior art.

Accordingly, it is an object of the present invention to provide new and improved modular apparatus for growing plants.

Another object of the invention is to provide new and improved modular apparatus for growing plants by hydroponics or the like.

And another object of the invention is to provide new and improved modular apparatus for growing plants in limited space.

Still another object of the present invention is to provide new and improved modular apparatus for growing plants conveniently and with less start-up cost.

Yet another object of the invention is to provide new and improved modular apparatus for growing plants in substantially any environment using very little space.

A further object of the present invention is to provide modular apparatus for growing plants that can be extended vertically and horizontally substantially as far and in any shape desired.

SUMMARY OF THE INVENTION

Briefly, to achieve the desired objects of the instant invention in accordance with a preferred embodiment thereof, provided is modular plant growing apparatus including a housing with inner and outer walls, opposed side walls, a bottom wall, and a top wall interconnected to form an enclosure. A liquid nutrient solution reservoir is formed, at least partially by the bottom wall and the inner and outer walls in the enclosure. At least one of the inner and outer walls includes plant supporting structure with plant receiving openings extending from external to the enclosure to internal to the enclosure. A pump is positioned in liquid communication with the reservoir. A manifold and distribution conduits are in liquid communication with the pump and constructed and positioned to supply liquid nutrient solution from the reservoir to at least roots of plants positioned in the plant supporting structure.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF THE PREFERRED EMBODIMENTS

Figure 1:
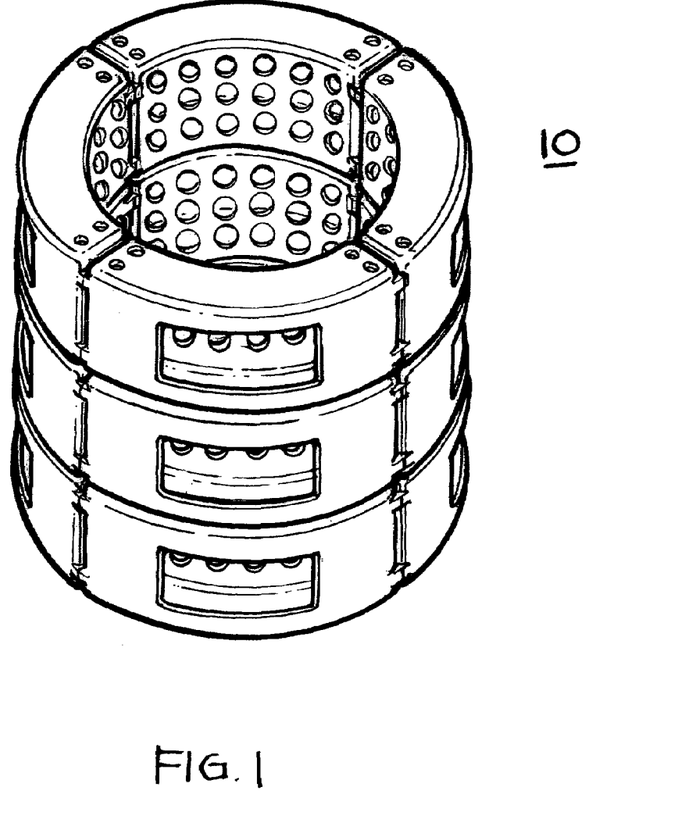
FIG. 1 is a top isometric view of one arrangement of modular plant growing apparatus in accordance with the present invention.
Figure 2:
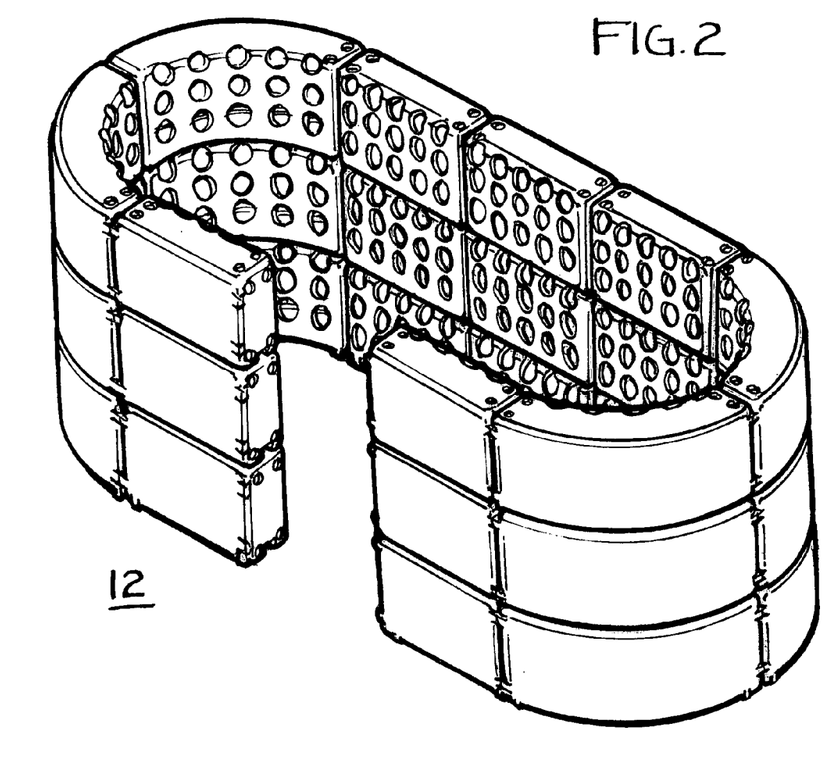
FIG. 2 is a top isometric view of another arrangement of modular plant growing apparatus in accordance with the present invention.

Turning now to the drawings in which like reference characters indicate corresponding elements throughout the several views, attention is first directed to FIG. 1, which illustrates one arrangement 10 for modular plant growing apparatus in accordance with the present invention. As can be seen from FIG. 1, arrangement 10 is results in a substantially circular configuration. A second arrangement 12 for modular plant growing apparatus in accordance with the present invention is illustrated in FIG. 2. As can be seen from FIG. 2, arrangement 12 results in a substantially elliptical configuration, which may be completely enclosed or not, as desired for convenience. The modules of FIGS. 1 and 2 are illustrated in a somewhat simplified form, since the figures are only intended to illustrate two of the variety of arrangements that can be formed using the modules of the present invention. It is preferred that the arrangements are generally designed to afford relatively uniform light quality and quantity from any light source or sources to all plants residing in the arrangement. Also, the number of modules that may be included in the arrangement is determined only by the convenience and the specific application, circumstances, or conditions.

Figure 3:
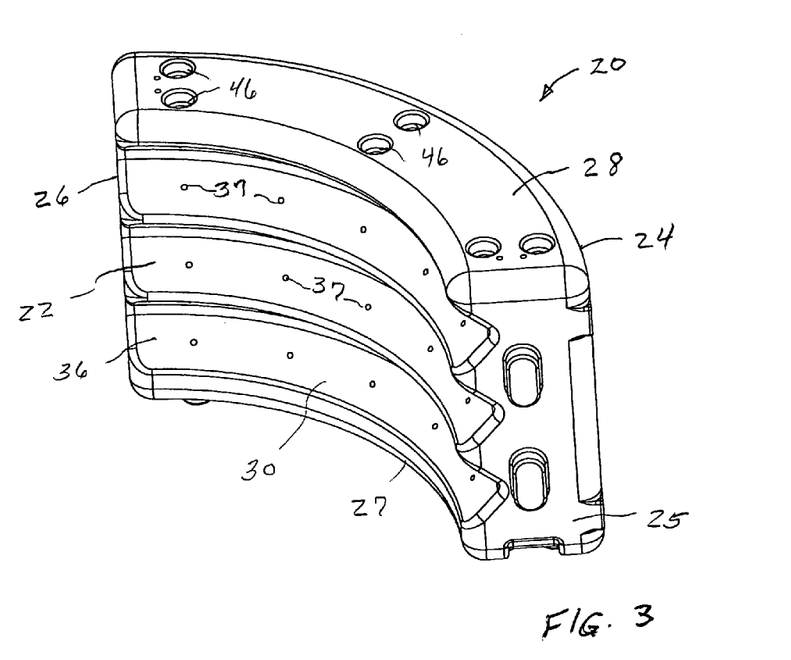
FIG. 3 is an inner, top isometric view, of a single corner module in accordance with the present invention (note that plant receiving openings are illustrated as dimples for simplicity of understanding in FIGS. 3 through 19)
Figure 4:
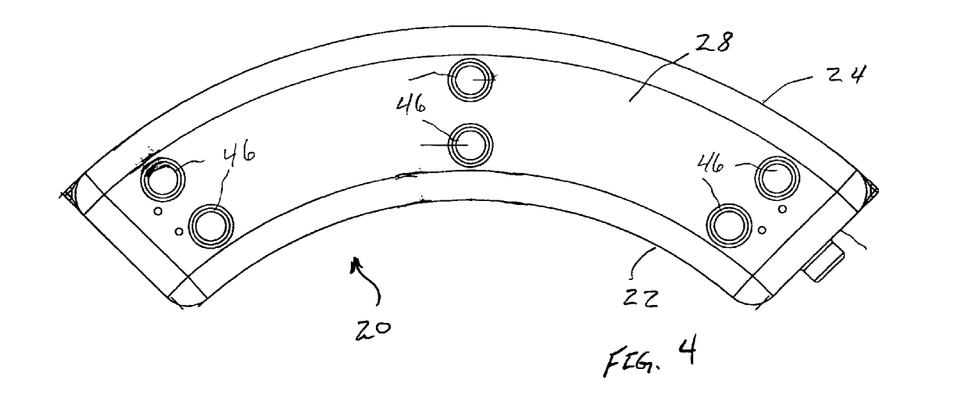
FIG. 4 is a top plan view of the single corner module of FIG. 3.
Figure 5:
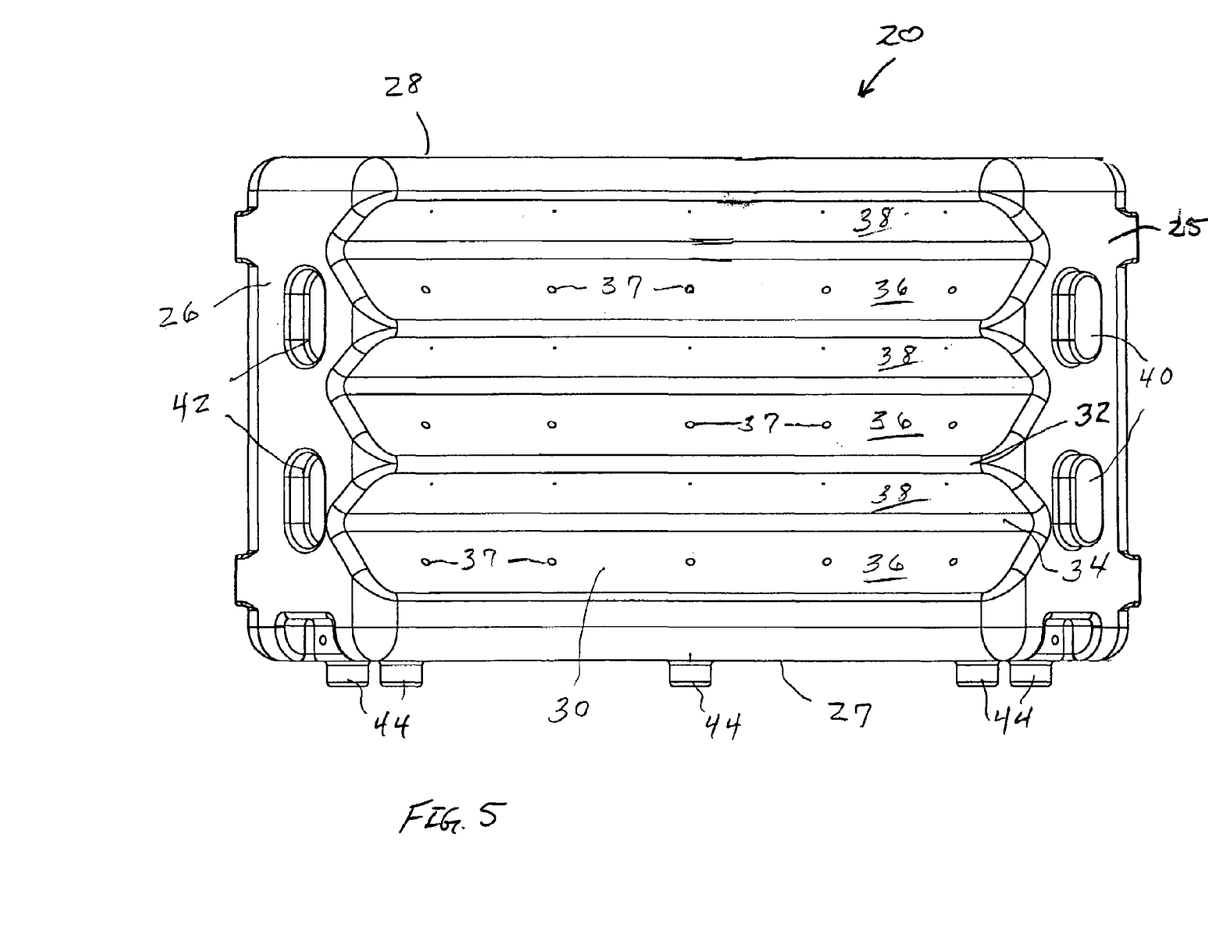
FIG. 5 is an inner side view of the single corner module of FIG. 3.
Figure 6:
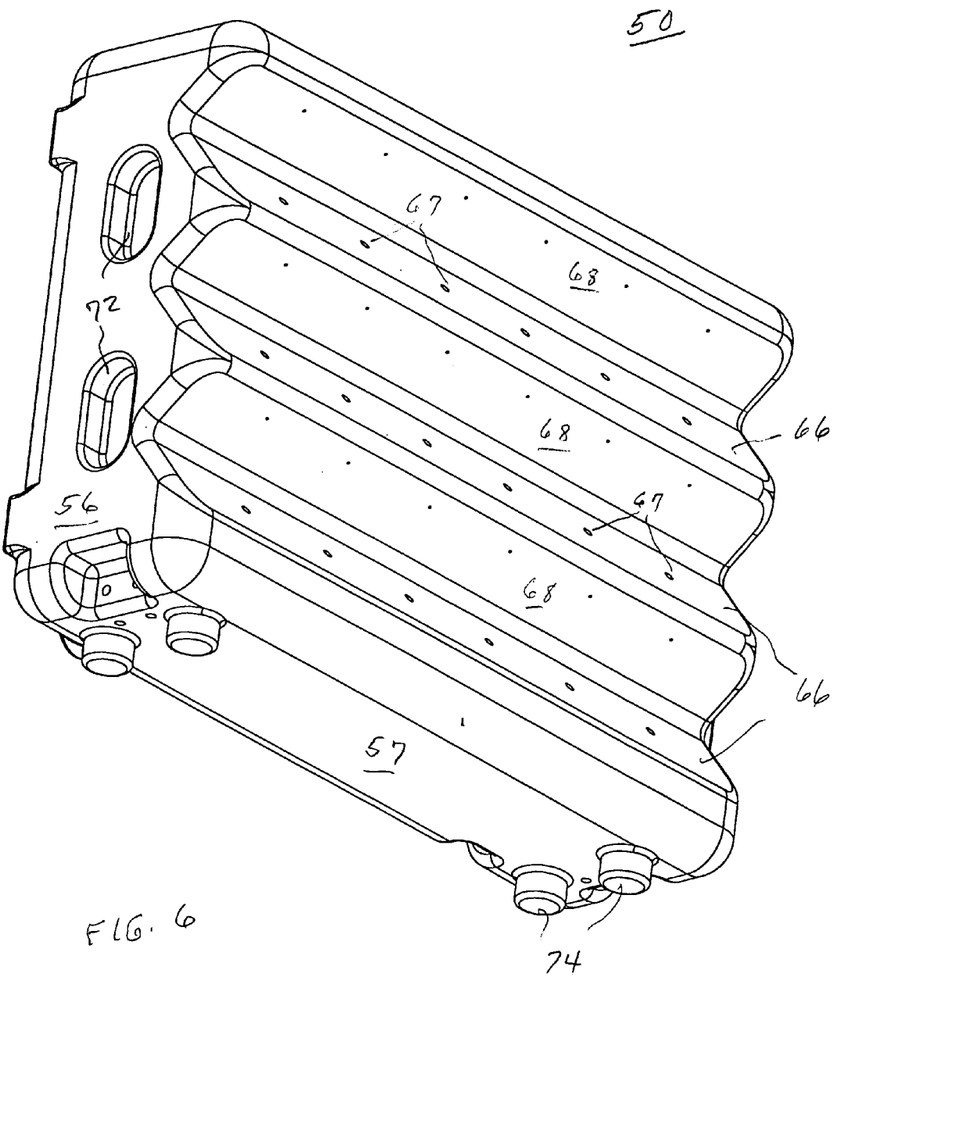
FIG. 6 is a left-hand inner, bottom isometric view of a single straight module in accordance with the present invention.
Figure 7:
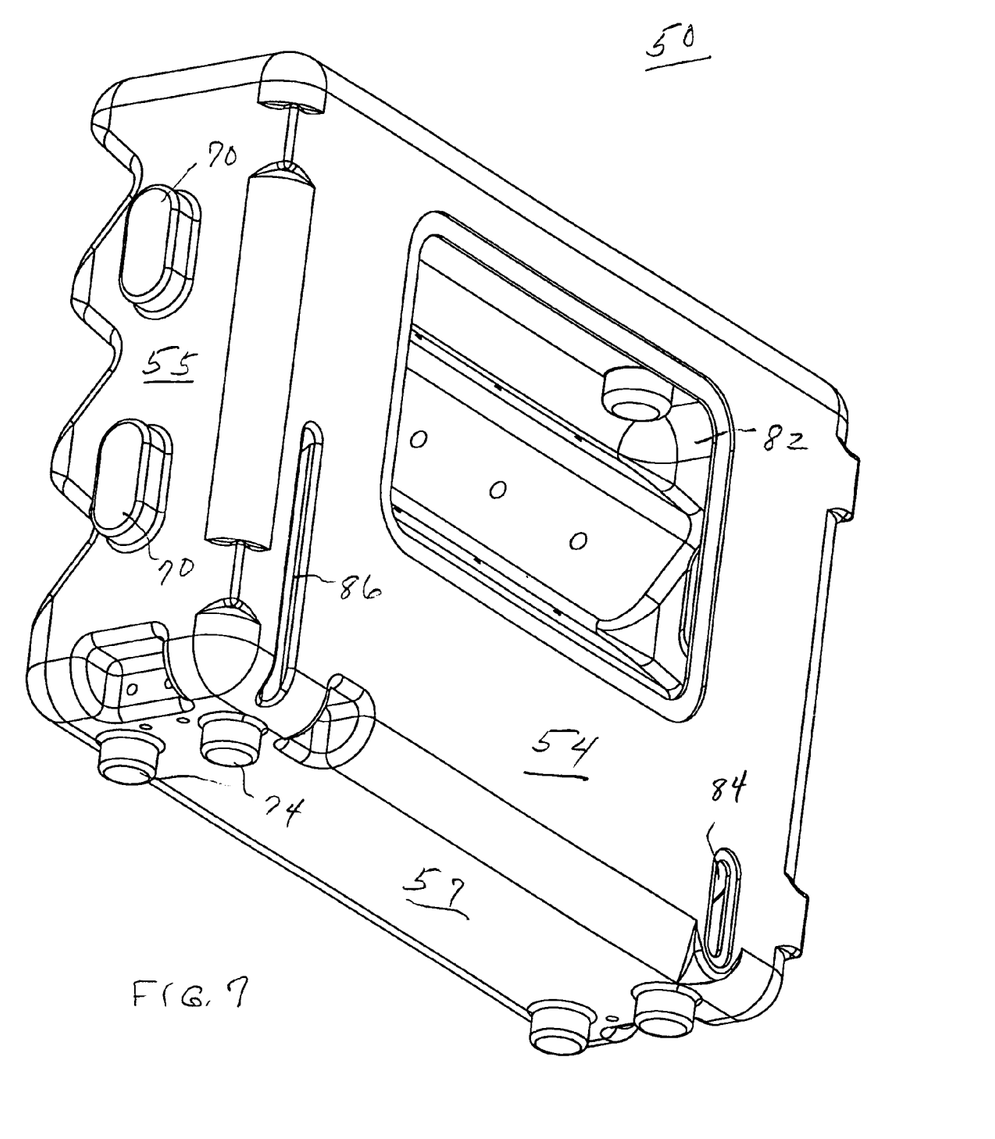
FIG. 7 is an outer, bottom isometric view of the single straight module of FIG. 6.
Figure 8:
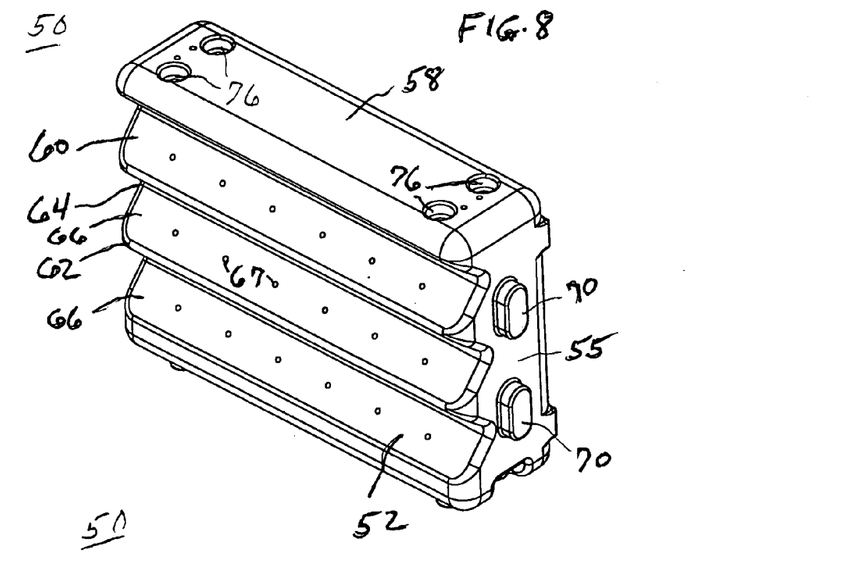
FIG. 8 is a right-hand inner, top isometric view of the single straight module of FIG. 6.
Figure 9:
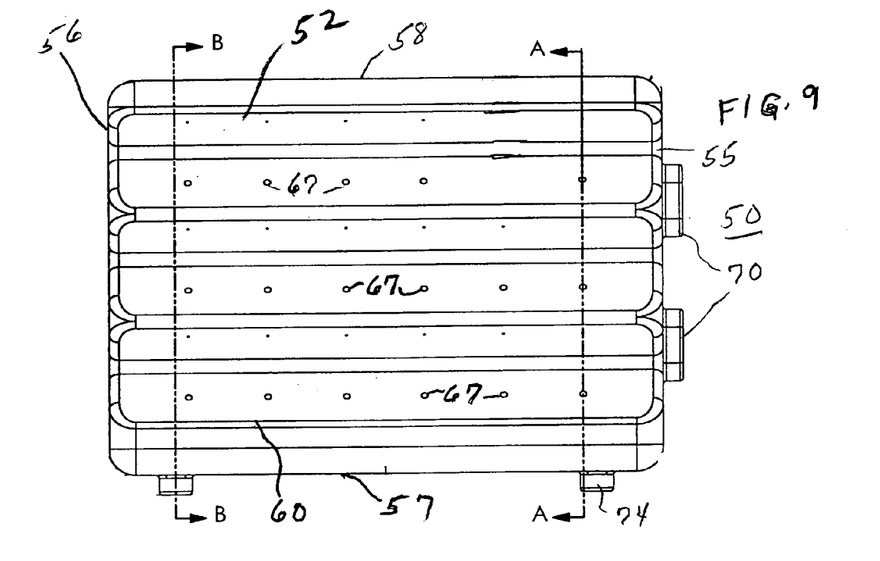
FIG. 9 is an inner side plan view of the single straight module of FIG. 6.
Figure 10:
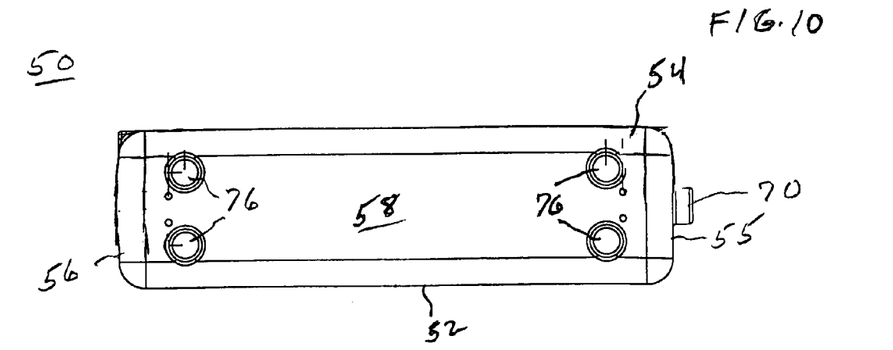
FIG. 10 is a top plan view of the straight module of FIG. 9.
Figure 11:
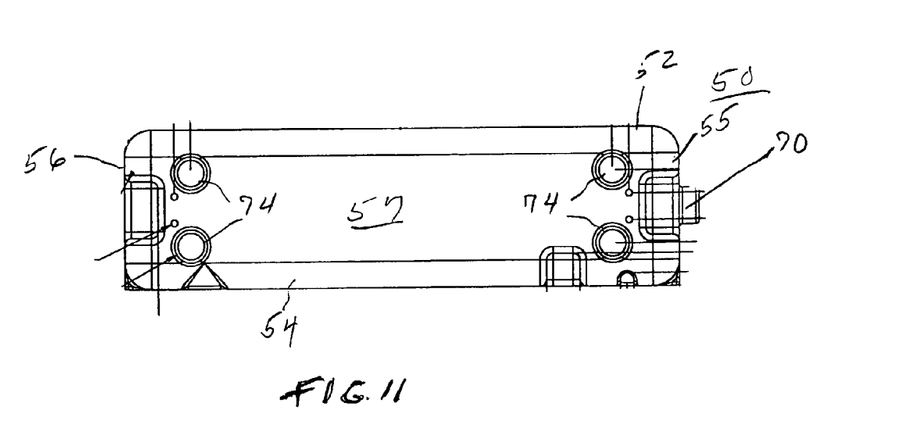
FIG. 11 is a bottom plan view of the straight module of FIG. 9.
Figure 12:
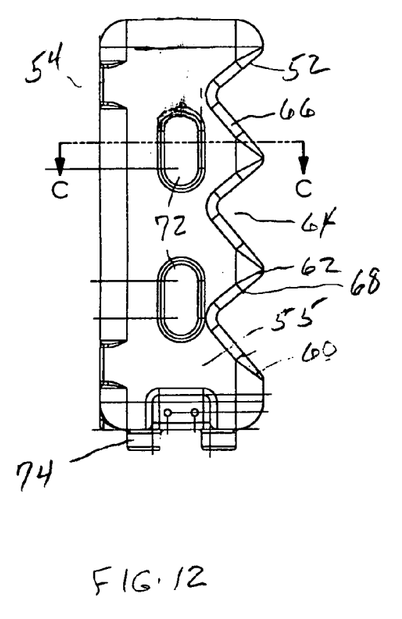
FIG. 12 is a left side plan view of the straight module of FIG. 9.
Figure 13:
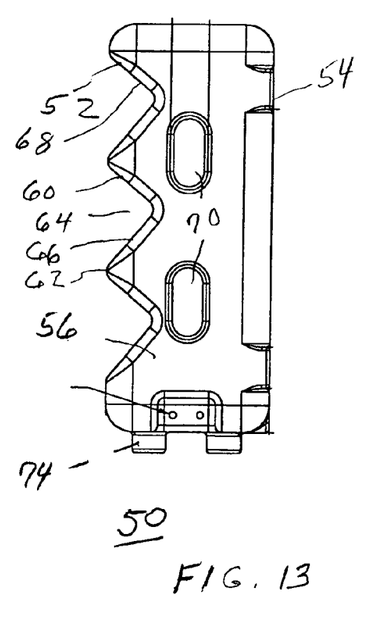
FIG. 13 is a right side plan view of the straight module of FIG. 9.
Figures 14, 18, 19:
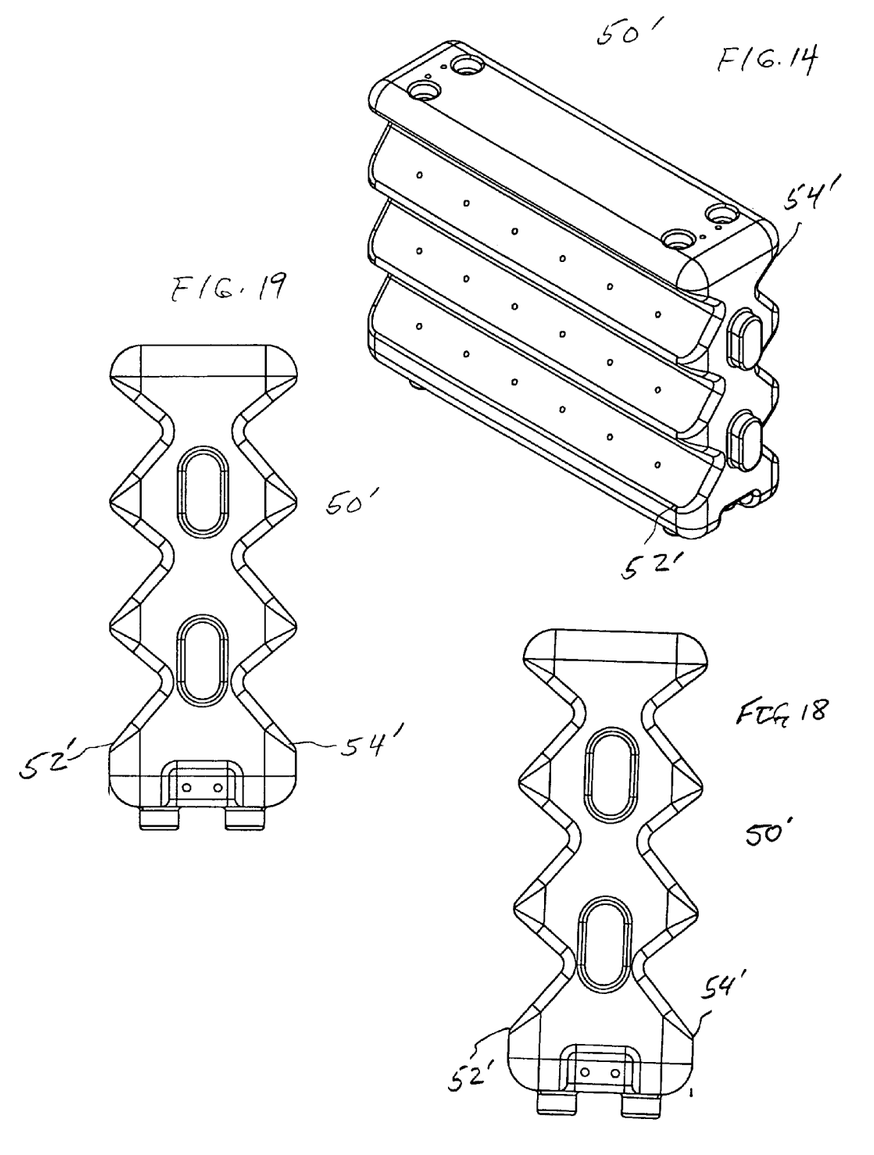
FIGS. 14 through 19 are views similar to FIGS. 8 through 13, respectively, of an alternate embodiment.
Figure 15:
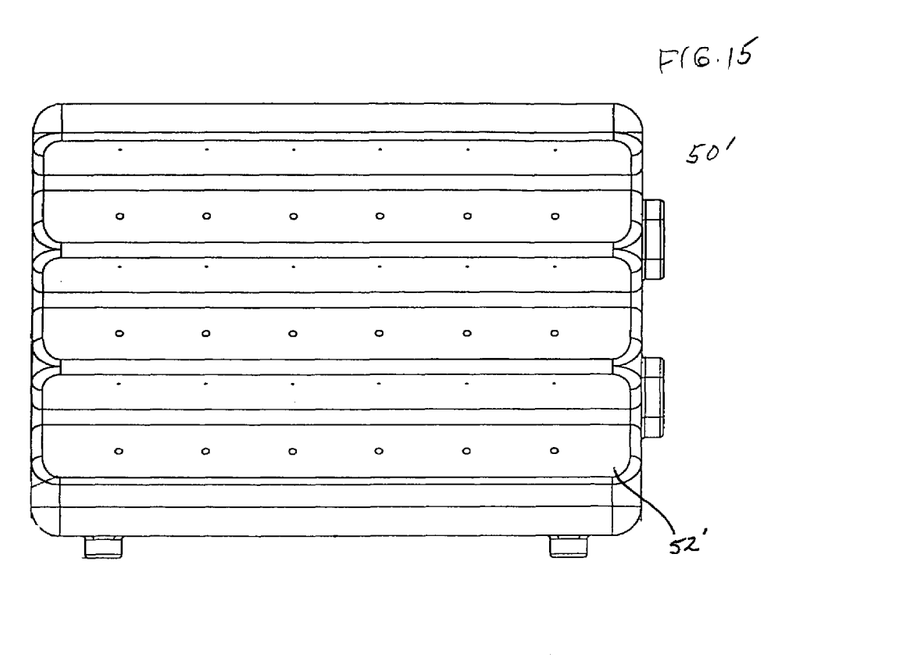
Figure 16:
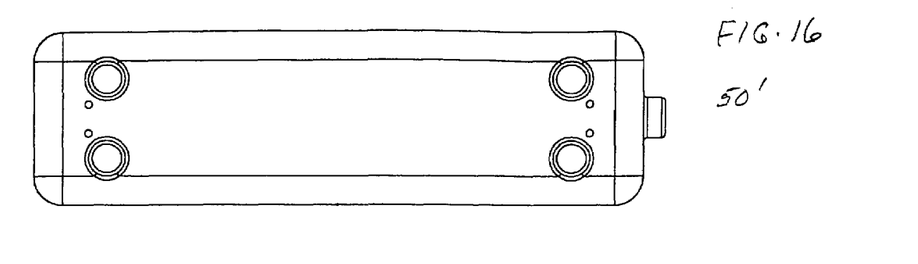
Figure 17:
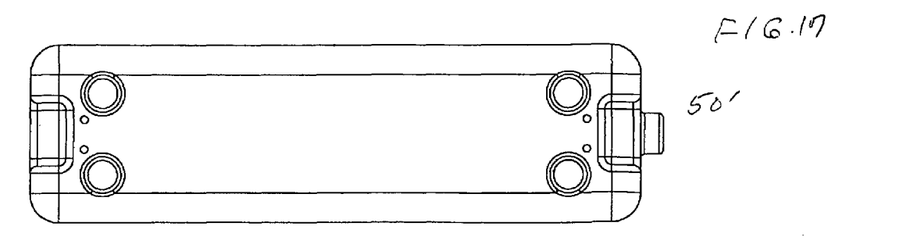

Referring to FIGS. 3, 4, and 5, an inner, top isometric view, top plan and inner plan view, respectively, illustrate a single corner module 20, in accordance with the present invention. Corner module 20 includes an inner wall 22, an outer wall 24, opposed side walls 25 and 26, a bottom wall 27, and a top wall 28 interconnected to form an enclosure. A liquid nutrient solution reservoir is formed at the bottom of the enclosure, at least partially by bottom wall 27, inner wall 22, and outer wall 24, as will be explained and illustrated in more detail below. In this embodiment, inner wall 22 includes plant supporting structure 30 with plant receiving openings (illustrated as dimples in these figures for simplicity) extending from external to the enclosure to internal to the enclosure.

In this embodiment, plant supporting structure 30 is formed by corrugating inner wall 22 to form a plurality of vertically separated, alternate generally V-shaped ridges 32 and depressions 34. The alternate ridges 32 and depressions 34 extended horizontally in an arcuate configuration so that a lower surface 36 of each depression 34 (or ridge 32) is directed generally inwardly and upwardly toward a locus of the arc. Further, in the preferred embodiment, lower surface 36 forms an angle of approximately 90 degrees with an upper surface 38. A plurality of horizontally spaced apart dimples 37 are positioned in each lower surface 36. Plant receiving openings extending from external to the enclosure to internal to the enclosure are formed at each dimple 37, as will be described in more detail below.

Side wall 25 includes coupling protrusions 40, which in this embodiment include a pair of oval-shaped wall extensions. Side wall 26 includes coupling openings 42, which in this embodiment include a pair of oval-shaped wall depressions designed to mate with coupling protrusions 40 on a coupled module located horizontally adjacent module 20. Bottom wall 27 includes coupling protrusions 44, which in this embodiment include circular-shaped feet. Top wall 28 includes coupling openings 46, which in this embodiment include circular-shaped openings positioned to mate with coupling protrusions 44 on a coupled module located vertically adjacent module 20. Thus, a plurality of modules 20 can be arranged, for example, as illustrated in arrangement 10 of FIG. 1 and held firmly in position, horizontally by mating protrusions 40 and openings 42 and held firmly in position, vertically by mating protrusions 44 and openings 46. It will be understood that, while a specific configuration and position for the protrusions and mating openings have been illustrated for purposes of this explanation, other configurations may be devised.

Turning now to FIGS. 6 through 13, a single straight module 50, in accordance with the present invention, is illustrated in the several views. Straight module 50 includes an inner wall 52, an outer wall 54, opposed side walls 55 and 56, a bottom wall 57, and a top wall 58 interconnected to form an enclosure. A liquid nutrient solution reservoir is formed at the bottom of the enclosure, at least partially by bottom wall 57, inner wall 52, and outer wall 54, as will be explained and illustrated in more detail below. In this embodiment, inner wall 52 includes plant supporting structure 60 with plant receiving openings (illustrated as dimples in these figures for simplicity) extending from external to the enclosure to internal to the enclosure.

In this embodiment, plant supporting structure 60 is formed by corrugating inner wall 52 to form a plurality of vertically separated, alternate generally V-shaped ridges 62 and depressions 64. The alternate ridges 62 and depressions 64 extended horizontally in a straight configuration so that a lower surface 66 of each depression 64 (or ridge 62) is directed generally outwardly and upwardly. Further, in the preferred embodiment, lower surface 66 forms an angle of approximately 90 degrees with an upper surface 68. A plurality of horizontally spaced apart dimples 67 are positioned in each lower surface 66. Plant receiving openings extending from external to the enclosure to internal to the enclosure are formed at each dimple 67, as will be described in more detail below.

Side wall 55 includes coupling protrusions 70, which in this embodiment include a pair of oval-shaped wall extensions. Side wall 56 includes coupling openings 72, which in this embodiment include a pair of oval-shaped wall depressions designed to mate with coupling protrusions 70 on a coupled module located horizontally adjacent module 50. Bottom wall 57 includes coupling protrusions 74, which in this embodiment include circular-shaped feet. Top wall 58 includes coupling openings 76, which in this embodiment include circular-shaped openings positioned to mate with coupling protrusions 74 on a coupled module located vertically adjacent module 50. Thus, a plurality of modules 50, or other modules such as modules 20, can be arranged, for example, as illustrated in arrangement 12 of FIG. 2 and held firmly in position, horizontally by mating protrusions 70 and openings 72 and held firmly in position, vertically by mating protrusions 74 and openings 76. It will be understood that, while a specific configuration and position for the protrusions and mating openings have been illustrated for purposes of this explanation, other configurations may be devised.

Referring additionally to FIGS. 14 through 19, another embodiment of a single straight module 50', in accordance with the present invention, is illustrated in the several views. Components in module 50' that are similar to components in module 50 (described above) are designated by the same number with a prime added to indicate the different embodiment. Module 50' is constructed substantially similar to module 50, except that in module 50' outer wall 54' is corrugated, similar to inner wall 52'. Thus, in this embodiment, both inner wall 52' and outer wall 54' include plant supporting structure 60'. It will be understood that plant supporting structure 60' of inner wall 52' and outer wall 54' will generally use separate light sources for plant growth so that this specific embodiment is useful for specially applications and probably would not be included in an arrangement like arrangement 12 of FIG. 2. However, modules 50' can still be stacked and coupled both vertically and horizontal.

It will be understood that any of the modules disclosed, including modules 20, 50, and 50', can be fabricated using any of a variety of methods. In the preferred embodiment the inner wall, the opposed side walls, and the bottom and top walls (e.g. inner 22, opposed side walls 25 and 26, bottom wall 27, and top wall 28) are formed in one integral unit, with the outer wall (e.g. outer wall 24) attachable by adhesive, welding, clamps, or the like. All or any portion of the modules can be formed of plastic, metal, or any other convenient material and the modules can be fabricated by molding, or any other convenient process. Since the lower portion of a module may be used as a liquid reservoir, it is desirable that at least the lower portion of the inner wall, the opposed side walls, the bottom wall, and the outer wall be substantially liquid leak proof.

Figure 20:
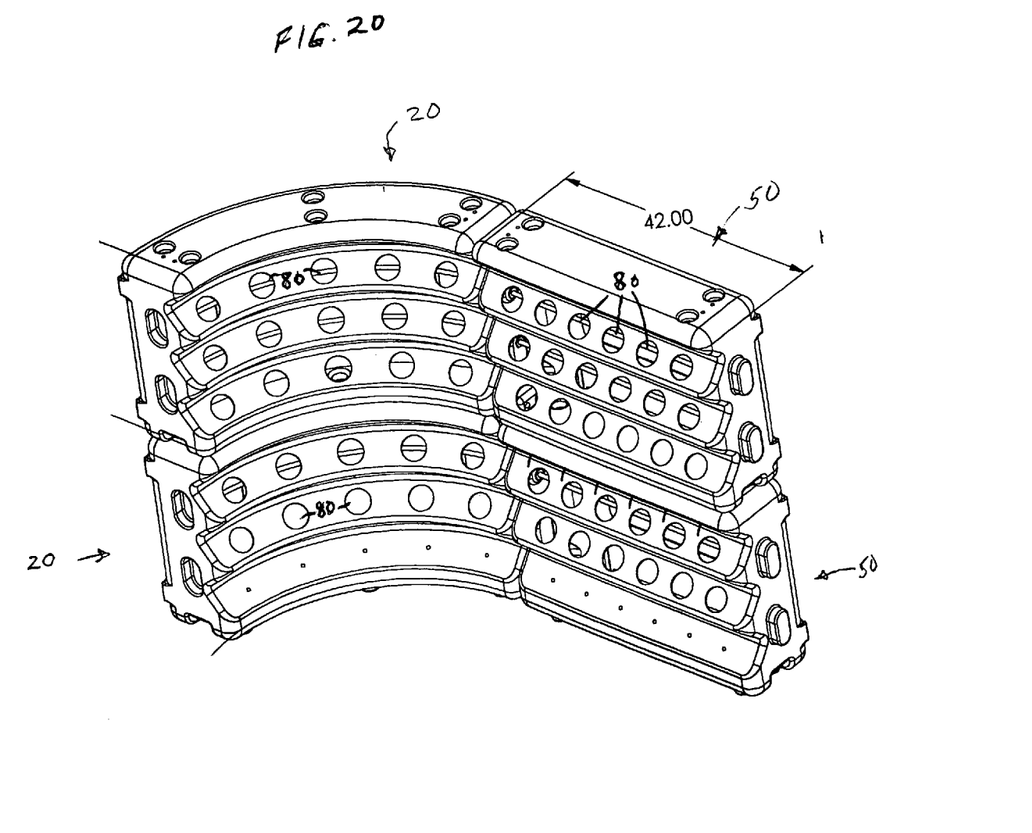
FIG. 20 is an inner, top isometric view of four modules interconnected modules, in accordance with the present invention.
Figure 21:
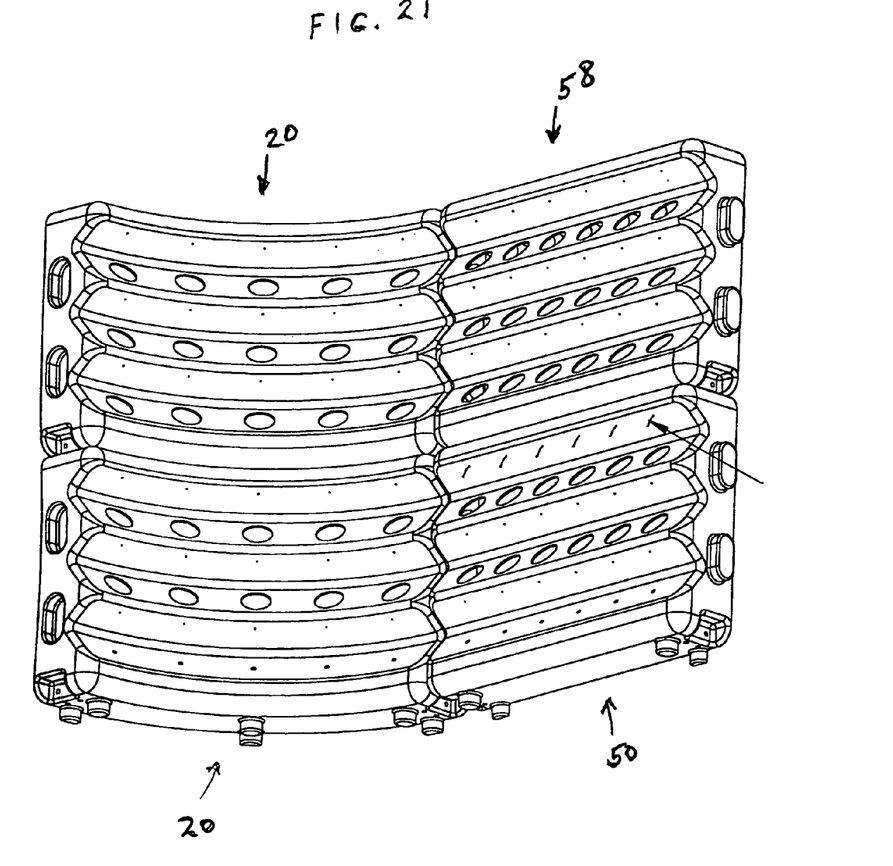
FIG. 21 is an inner, bottom isometric view of the four inner connected modules of FIG. 20, with the outer shell removed.

Referring to FIGS. 20 and 21, four modules, in accordance with the present invention, are interconnected to form a portion of an arrangement, such as arrangement 12 depicted in FIG. 2. The four modules include a curved module 20 and a straight module 50 connected together, in this specific example to form a common unit with two common units stacked vertically in this example. Each of the modules 20 and 50 are connected and positioned so that inner walls 32 and 52 are directed inwardly and surfaces 36 and 66 of plant supporting structures 30 and 60 extend horizontally in substantially continuous rows. Plant receiving openings 80 are formed at the location of each dimple 37 and 67. In this embodiment, the lowest lower surface 36 and 66 in at least the lower modules 20 and 50 do not have plant receiving openings formed therein so that the lower portion of each lower module 20 and 50 serves as a reservoir for liquid nutrient solutions.

Figure 22:
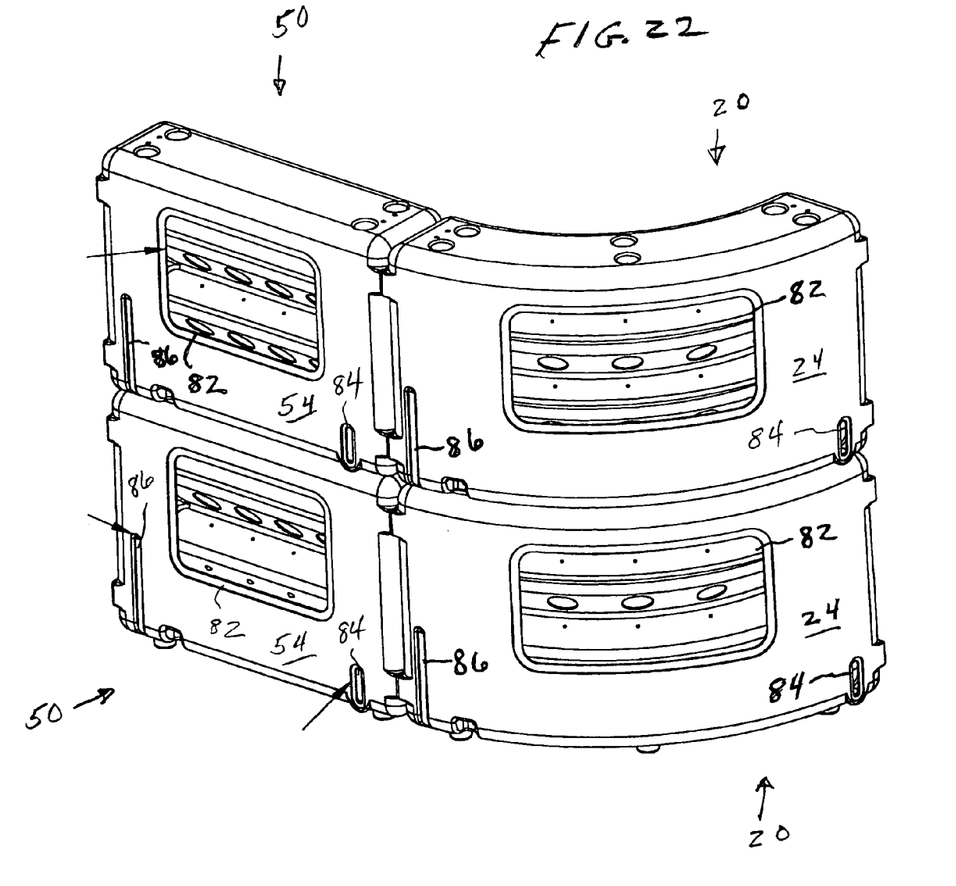
FIG. 22 is an outer, top isometric view of the four inner connected modules of FIG. 20.

Referring additionally to FIG. 22, outer walls 24 and 54 of modules 20 and 50, respectively, are illustrated. Each outer wall 24 and 54 of each module 20 and 50, respectively, includes a clear access window 82 mounted to be removable or hinged to provide viewing and access to the internal enclosure. It will be understood that an opaque access panel can be employed instead of clear access window 82. For example, liquid may be introduced, or maintained at a desirable level, by introducing the liquid through access window 82. Also, each outer wall 24 and 54 of each module 20 and 50, respectively, includes a liquid level indicator 84 viewable from the exterior of the internal enclosure so that the level of the liquid can be conveniently maintained without disturbing the plants. An electrical access opening 86 is provided in each outer wall 24 and 54 for the extension of an electric line from a pump, to be discussed presently. While all modules 20 and 50 in the arrangement illustrated in FIG. 22 do not necessarily include a liquid reservoir or a pump, in the preferred embodiment, modules 20 and 50 are manufactured as standard modules and, thus, some features may be included that are not necessarily used in all applications.

In this embodiment three corrugations 42 are formed in each module but it will be understood that any number of corrugations, from one to as many as can be conveniently used, can be incorporated generally depending upon the size and shape of the modules. Each corrugation has openings 80 therein (except for the reservoir forming corrugations) for receiving plant carrying devices. Here it will be understood that plant carrying devices can be any convenient means of supporting plants in openings 80, including but not limited to porous plastic baskets, peat moss baskets, wire baskets or holders, etc. Also, it will be understood that the corrugations could be constructed to hold plants without the use of extra baskets, in some special applications.

Figure 23:
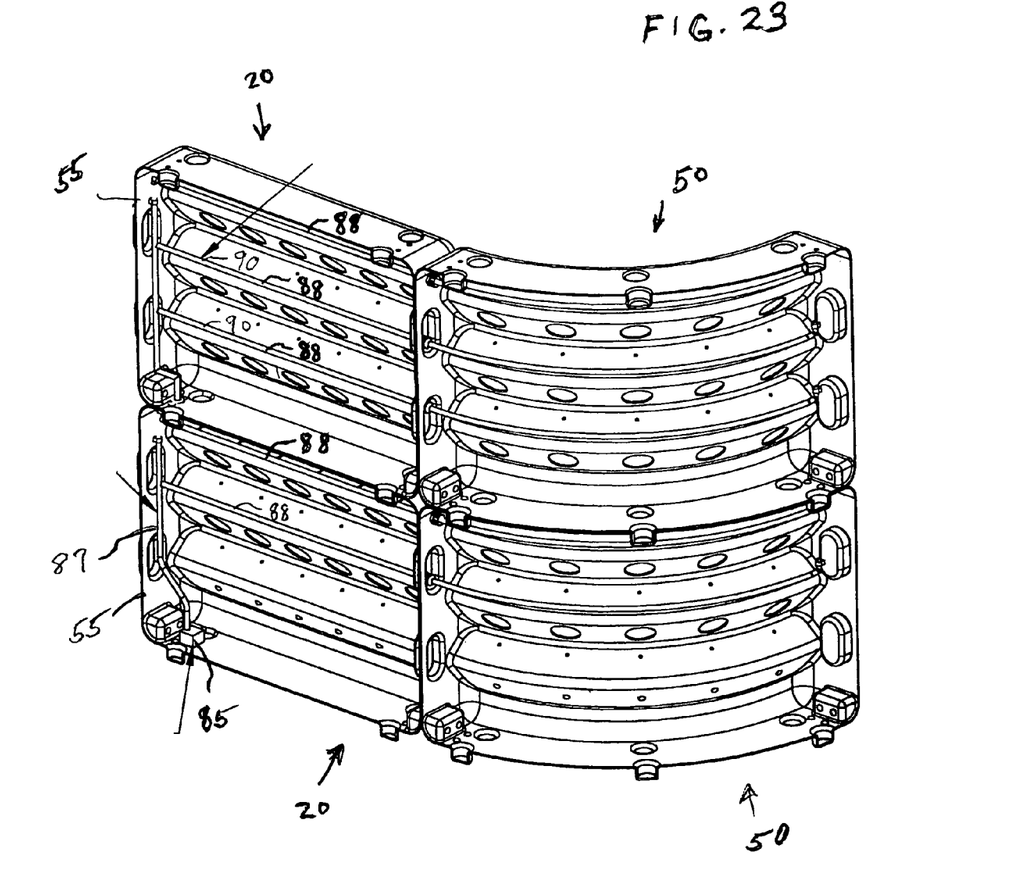
FIG. 23 is an outer, top isometric view of the four inner connected modules of FIG. 20 (similar to FIG. 22), with the outer wall removed to illustrate internal components.

Referring additionally to FIG. 23, a rear view of the four module arrangement, similar to FIG. 22, is illustrated with outer walls 24 and 54 of each module 20 and 50 removed to show the internal enclosure and components. In this four module arrangement, a pump 85 is located so as to be in communication with liquid in one reservoir, in this example the lower module 20. Pump 85 can be a submersible type or one that communicates with the reservoir through a connecting tube. Here it should be understood that the liquid nutrient solution in the reservoir is generally at some convenient level below the second corrugation in the lower modules. Also, it is preferable that reservoirs in adjacent modules are in liquid communication so as to provide continuous circulation therethrough. Generally, pump 85 is an electric pump that is connected by insulated and liquid proof wires (not shown) that extend through an electrical access opening 86 in outer wall 24 or 54 (above the level of the liquid nutrient solution), as illustrated in FIG. 22, external to module 20 or 50 so as to plug into a convenient wall socket, for example.

A liquid manifold 87 extends vertically along the inner surface of side wall 55 of lower module 50, through an opening formed for that purpose in top wall 58 of lower module 50, through an opening formed for that purpose in bottom wall 57 of upper module 50, and along the inner surface of side wall 55 of upper module 50. Distribution conduits 88 extend from manifold 87 horizontally adjacent the undersurface of each lower surface 36 in modules 20, through openings in the sides of modules 20 and 50, and adjacent the undersurface of each lower surface 66 in modules 50. Distribution conduits 88 include spray nozzles 90 situated to spray liquid nutrient solution onto the roots of plants in openings 80, generally one nozzle 90 per opening 80. Spray nozzles 90 may be directional, semi-directional, or omni-directional separate components mounted in openings in distribution conduits 88 or they may simply be very small misting type openings formed directly in distribution conduits 88.

Here it is convenient to note that the corrugations in modules 20 and 50 are constructed so that lower surfaces 36 and 66, respectively, and upper surfaces 38 and 68, respectively, form an angle (in this preferred embodiment approximately 90 degrees) that conveniently allows the roots to be exposed below surfaces 36 and 66 for convenient application of liquid nutrient solution, while the plants extend above surfaces 36 and 66 so as to receive maximum light and growing room. In general, the angle should be formed so that upper surfaces 38 and 68 retain moisture from distribution conduits 88 and nozzles 90 (if present) within the enclosure while not interfering with plant growth.

In the preferred embodiment liquid manifold 87 is formed of ½ inch plastic tubing but it will be understood that other materials and appropriate sizes may be used. Also, distribution conduits 88 include ¼ inch plastic tubing but it will be understood that other materials and appropriate sizes may be used. Thus, manifold 87 and distribution conduits 88 are connected into a continuous system for carrying liquid nutrient solution from the reservoir to the roots of plants residing in openings 80 in all four modules of the arrangement. Generally, pump 85 may run continuously are at timed intervals to ensure sufficient liquid nutrient solution on the roots of the plants, depending at least in part on the construction or makeup of modules 20 and 50, the numbers coupled together, and the surrounding atmosphere. It will be understood that the liquid distribution system disclosed for the four module arrangement can be used to distribute liquid within all of the modules in, for example, the arrangements illustrated in FIGS. 1 and 2, if desired. Also, in some specific applications it may be inconvenient to use a single pump 85 and interconnected reservoirs, in which case a pump and manifold can be included in each separate module 20 or 50, or in each separate vertical stack of modules 20 or 50.

Thus, new and improved modular apparatus for growing plants has been disclosed. The new and improved modular apparatus is used, generally, for growing plants by hydroponics or the like. Further, the new and improved modular apparatus is convenient for growing plants in limited space and with less start-up cost. Utilizing the new and improved modular apparatus, growing plants in substantially any environment using very little space can be easily and inexpensively accomplished. To this end, modules are disclosed that can be used individually or in any desired horizontal and vertical arrangement. The modular entire apparatus is constructed to conveniently plug into and operate from, for example, a standard electrical wall socket.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

The invention claimed is:

1. Modular plant growing apparatus comprising:
a plurality of modules, each module including
a housing including inner and outer walls, opposed side walls, a bottom wall, and a top wall interconnected to form an enclosure,
a liquid nutrient solution reservoir formed, at least partially by the bottom wall and the inner and outer walls in the enclosure,
at least one of the inner and outer walls including plant supporting structure with plant receiving openings extending from external to the enclosure to internal to the enclosure, wherein the plant supporting structure includes a plurality of horizontally extending, vertically separated corrugations formed in the inner wall, and
a pump in liquid communication with the reservoir and a manifold and distribution conduits in liquid communication with the pump and constructed and positioned to supply liquid nutrient solution from the reservoir to at least roots of plants positioned in the plant supporting structure;
each module further including feet extending downwardly from the bottom wall and the top wall including mating openings for receiving the downwardly extending feet of a vertically adjacent module for vertical stacking;
each module further including coupling protrusions extending outwardly from one of the opposed side walls with another of the opposed side walls including mating openings for receiving coupling protrusions of a horizontally adjacent module for horizontal stacking;
the plurality of modules including at least one module in which the inner and outer walls and the bottom and top walls are horizontally straight to form a straight sided module;
the plurality of modules including at least one module in which the inner and outer walls and the bottom and top walls are horizontally arcuate to form an arcuate corner module; and
wherein the plurality of modules are stacked horizontally and vertically and removably affixed together, using the feet and mating openings and the coupling protrusions and mating openings, to form one of a substantially circular configuration with a plurality of vertically stacked modules and a substantially elliptical configuration.

2. Modular plant growing apparatus as claimed in claim 1 wherein the plurality of horizontally extending, vertically separated corrugations formed in the inner wall, each corrugation including a lower surface with a plurality of horizontally spaced apart plant receiving openings.

3. Modular plant growing apparatus as claimed in claim 1 wherein the plant supporting structure includes a plurality of horizontally extending, vertically separated corrugations formed in the inner wall and in the outer wall.

4. Modular plant growing apparatus as claimed in claim 1 wherein the outer wall includes a clear access window.

5. Modular plant growing apparatus as claimed in claim 1 wherein the pump is positioned within the enclosure.

6. Modular plant growing apparatus comprising:
a plurality of modules, each module including
a housing including inner and outer walls, opposed side walls, a bottom wall, and a top wall interconnected to form an enclosure,
a liquid nutrient solution reservoir formed, by lower portions of the bottom wall, the opposed side walls, and the inner and outer walls in the enclosure,
at least one of the inner and outer walls defining plant supporting structure including a plurality of horizontally extending, vertically separated corrugations formed in the inner wall, each corrugation including a lower surface with a plurality of horizontally spaced apart plant receiving openings extending from external to the enclosure to internal to the enclosure, and
a pump positioned in the enclosure in liquid communication with the reservoir and a manifold and interconnected distribution conduits in liquid communication with the pump, the distribution conduits including a plurality of spray nozzles associated with the plant receiving openings within the enclosure and constructed and positioned to supply liquid nutrient solution from the reservoir to at least roots of plants positioned in the plant receiving openings;
each module further including feet extending downwardly from the bottom wall and the top wall including mating openings for receiving the downwardly extending feet of a vertically adjacent module for vertical stacking;
each module further including coupling protrusions extending outwardly from one of the opposed side walls with another of the opposed side walls including mating openings for receiving coupling protrusions of a horizontally adjacent module for horizontal stacking;

the plurality of modules including at least one module in which the inner and outer walls and the bottom and top walls are horizontally straight to form a straight sided module;

the plurality of modules including at least one module in which the inner and outer walls and the bottom and top walls are horizontally arcuate to form an arcuate corner module; and wherein the plurality of modules are stackable horizontally and vertically, using the feet and mating openings and the coupling protrusions and mating openings, to form one of a substantially circular configuration and a substantially elliptical configuration.

7. Modular plant growing apparatus as claimed in claim 6 wherein the outer wall includes a clear access window.

8. Modular plant growing apparatus as claimed in claim 6 wherein a plurality of straight sided modules and a plurality of arcuate corner modules are stacked horizontally and vertically to form a substantially elliptical configuration.

9. Modular plant growing apparatus as claimed in claim 6 wherein a plurality of arcuate corner modules are stacked horizontally and vertically to form a substantially circular configuration with a plurality of vertically stacked modules.

* * * * *